(No Model.)
H. CLAY.
TELEPHONE.
No. 277,112.  Patented May 8, 1883.
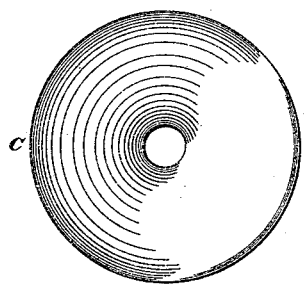
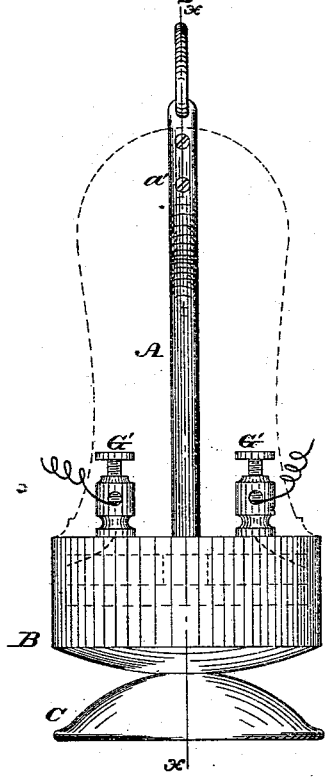
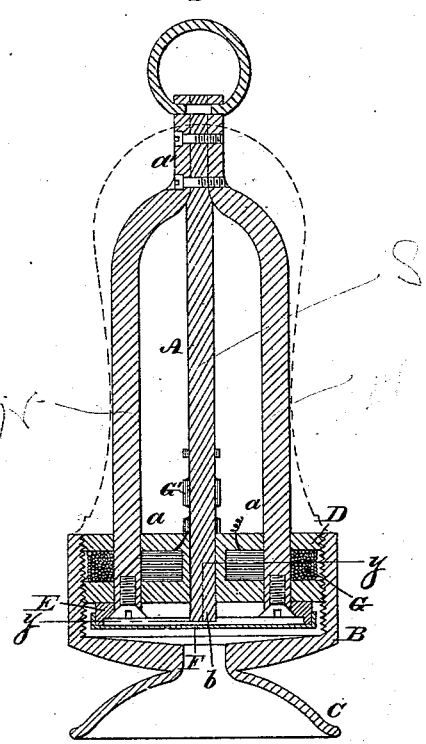
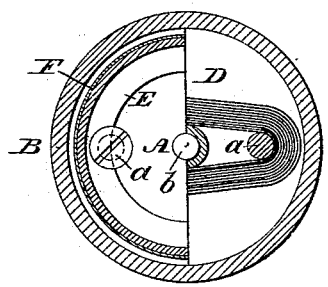
WITNESSES:
A. P. Grant,
W. F. Kircher
INVENTOR:
Henry Clay,
BY Joshua Biedersheim
ATTORNEY.

(No Model.)
J. P. CLIFFORD.
AIR GAS MACHINE.
No. 277,113. Patented May 8, 1883.
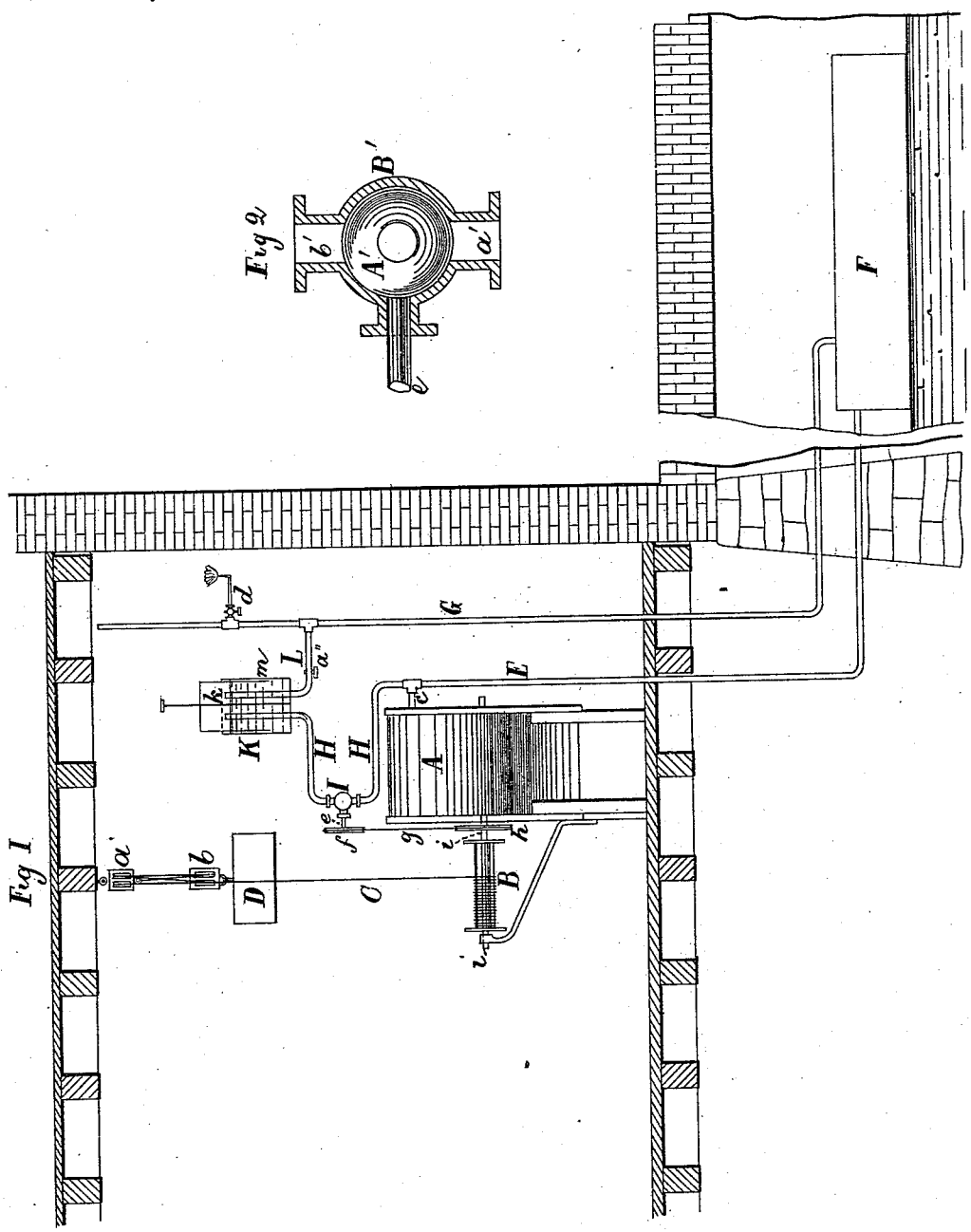
Witnesses
Rudolf H. Kjellman
Thomas E. Krossman
Inventor
James P. Clifford
per James A. Whitney
Attorney